Nov. 2, 1954  S. D. VIGREN ET AL  2,693,554
ELECTRICAL CONTROL MAGNET
Filed Feb. 4, 1953  3 Sheets-Sheet 1

INVENTORS
STEN DANIEL VIGREN,
WALTER OTTO WILHELM BROBERG,
ROLF ALBIN ZANDER
BY *Strauch, Nolan & Diggins*
ATTORNEY INVENTORS
STEN DANIEL VIGREN,
WALTER OTTO WILHELM BROBERG,
ROLF ALBIN ZANDER
BY *Stanck, Nolen & Diggins*
ATTORNEY Nov. 2, 1954  S. D. VIGREN ET AL  2,693,554
ELECTRICAL CONTROL MAGNET
Filed Feb. 4, 1953  3 Sheets-Sheet 3

INVENTORS
STEN DANIEL VIGREN
WALTER OTTO WILHELM BROBERG
ROLF ALBIN ZANDER
BY *Strauch, Nolan & Diggins*
ATTORNEY

United States Patent Office 2,693,554
Patented Nov. 2, 1954

2,693,554

ELECTRICAL CONTROL MAGNET

Sten Daniel Vigren, Stockholm, Walter Otto Wilhelm Broberg, Nynashamn, and Rolf Albin Zander, Stockholm, Sweden Application February 4, 1953, Serial No. 335,006

45 Claims. (Cl. 317—198)

This application is a continuation-in-part of our co-pending applications Serial No. 46,263, filed August 6, 1948, and Serial No. 143,016, filed February 8, 1950. Both of said applications are now abandoned.

The present invention relates to electric control magnets e. g. for switching apparatus such as relays, selectors and the like, and its object is to provide a switching device having an improved magnetic circuit as compared with previously known arrangements and being advantageous from a mechanical point of view, since its construction is such that only a few details, which are simple and inexpensive in manufacture, are needed.

For telephone relays, crossbar switches and other similar switching devices the number of ampere-turns required to operate the device make a point of great economical importance.

As is well known a considerably higher current is normally required to operate a relay than to keep the same operated upon energization. Certain measures may be taken in order to reduce the current through the relay winding upon its energization, but such arrangements will complicate and increase cost of the device itself and its associated circuit, and for this reason the operating current (pick-up current) will usually determine the current comsumption of the relay. In for instance telephone offices, where relays are provided in a very large number, even a slight decrease of the current consumption of the different switching means will cause a considerable improvement in the economy of operation of the plant. It is thus well justified to try to produce switching devices having low pick-up current even though the measures for reducing the latter should involve to some extent relative increase of the reset current.

There are a plurality of main types of relays and similar switching devices. In telephone equipment and weak current equipment in general either of two main types are used almost exclusively, which types have the feature in common that the armature has the form of a journalled lever and on operation performs a swinging or pivotal movement. In one of these main types, the so-called Kellog-type, the portion of the armature subject to the action of the magnetic force extends substantially perpendicular to the longitudinal direction of the magnet core, and the direction of movement of the armature tongue agrees substantially with the longitudinal direction of the core.

In the other main type under consideration, the so-called flat type relay, the armature extends substantially parallel with the longitudinal direction of the magnet core, and the direction of the movement of the armature tongue is substantially perpendicular to the longitudinal direction of the core.

The present invention relates foremost but not exclusively to the last-mentioned type of switching devices, i. e. the flat type relay. The principle of the invention may, however, also be applied to switching devices, which show only in certain respects resemblance to switching devices of the so-called flat type. Generally the invention is applicable to switching devices comprising a coil for energizing a rigid magnetic circuit, which is open so as to form at least two spaced end portions having different magnetic potentials, and a pivoted armature forming an iron path in the flux path between the said end portions.

The switching device according to the invention is foremost characterized by the fact that at least an essential portion of the said flux path is substantially parallel to the rotation axis of the armature, and further that the armature surface being acted upon by the magnetic flux emanating from at least one of the said end portions has such extension in a direction substantially perpendicular to the rotation axis of the armature, that that boundary line of the said surface, which is positioned nearest to the rotation axis of the armature, has a considerably shorter path of travel than that boundary line of the said surface, which is most distant from the rotation axis of the armature.

The invention will be described more in particular in conjunction with the accompanying drawings in which.

Figure 28:
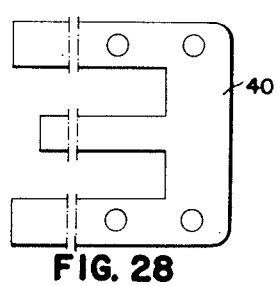

Figure 28 finally shows in plan view the rigid portion of the magnetic circuit of the relay shown in Figures 23–26.

Figure 29:
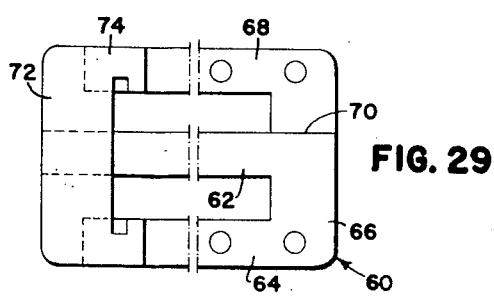

Figure 29 discloses an embodiment in which the magnetic circuit includes a field structure having only two magnetic legs.

Figure 1:
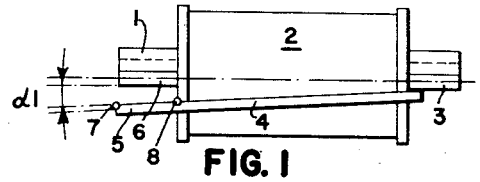
Figure 1 shows in simplified form a relay having a so-called flat type armature of known design.

The relay in Figure 1 is, as mentioned, an example of a relay having a flat armature (flat type relay) of a type, which is very frequently used. A magnetizing winding coil 2 surrounds a magnet core 1, which is extended at the rear into a fixed transverse yoke 3. The yoke 3, which is made of ferromagnetic material forms the bridge of the relay and is attached at either end to a bow- or U-shaped armature 4. This is pivoted or loosely hinged at the ends of the yoke 3 and extends with one leg on either side of the winding 2, and forms finally at the portion joining the two legs an armature tongue 5 having a surface actuated by a pole face 6 at the end of the core 1 facing the tongue. In the non-operated position the armature 4—5 forms an angle $\alpha_1$ with the plane of the pole face 6, which angle is determined by the length of the armature 4—5 and the required distance of movement of some point of the armature, for instance point 7 at the free end of the armature. At this point an actuating stud of a spring assembly mounted on the relay may be actuated. That boundary line of the armature surface, which is positioned nearest to the rotation axis of the armature extends at 8 adjacent to and across the front end of the winding.

It will be easily understood that since the angle $\alpha_1$ is relatively small and the distance between the points 7 and 8 is small as compared with the whole length of the armature, the difference between the length of the air gap at 7 and that of the air gap at 8 will be insignificant. This is true regarding non-operated or retracted as well as operated or attracted position of the armature. In the operated position the length of the air gap is determined by a residual stud not shown in the figure the purpose of which is to prevent the armature from remaining attracted by the residual magnetism after the interruption of the magnetizing current. The resultant of the attracting forces acting upon the armature has its resulting point of application somewhere between the points 7 and 8. This center of attraction may be assumed to be positioned about halfway between the points 7 and 8 or possibly somewhat nearer to point 8 than to point 7. Since the armature when attracted performs a substantially translational movement, the distribution of the magnetic reluctance in the air gap along the armature tongue will be substantially constant, and if the center of attraction should nevertheless travel towards point 8 during the movement of the armature, this depends on saturation conditions in the armature. However, it is obvious that such a travel is of no practical consequence since the length of the path along which such a travel would take place is negligible in relation to the distance between the fulcrum of the armature and the center of attraction, and the ratio of the resulting attracting force and the force obtainable at point 7 may be considered as practically constant.

Figure 2:
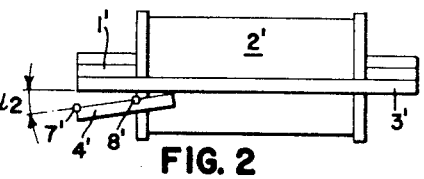
Figure 2 shows in point of principle a relay according to the invention for comparison with the relay according to Figure 1.
Figure 4:
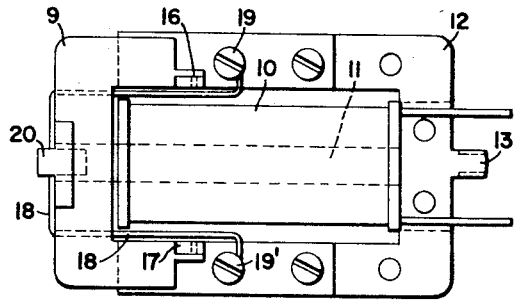
Figure 4 shows an embodiment of a relay according to the invention in bottom view.

In the relay according to the invention shown in Figure 2 conditions are quite different.

The designations 1', 2' etc. have been used in Figure 2 for those parts corresponding to the parts designated 1, 2 etc. in Figure 1.

The arrangement according to Figure 2 has been designed so as to fulfill the condition essential to the invention that that boundary line of the armature tongue, which is positioned nearest to the rotation axis of the armature, or the intersection of the plane or projection of the active armature face or surface in non-operated or retracted position with the plane or projection of the active core pole face, shall have a considerably shorter path of travel than that boundary line of the armature tongue, which is positioned most remote from the rotation axis of the armature or said intersection. In other words the length of the air gap at points 8' is considerably shorter than the length of the air gap at point 7' when the armature is in non-operated or retracted position, while the difference between these lengths is much less when the armature is in operated or attracted position and may even decrease to nil.

This has been achieved in the flat type relay illustrated, by extending the yoke 3' on both sides of the winding 2' and pivoting loosely hinging or otherwise mounting a relatively short armature for angular movement on the legs of this yoke so that the legs of the yoke serve to conduct the magnetic flux up to the armature.

Assuming now that it is desired to maintain the same length of travel for point 7' as for point 7 in Figure 1, it will be seen that the angle $\alpha_2$ between the armature tongue and the pole face of the core 1' will be considerably greater than the corresponding angle $\alpha_1$ in Figure 1. Assuming that the position of point 7' is maintained invariable and that the fulcrum of the armature is displaced successively by variation of the length of the armature legs from the rear portion of the yoke 3' towards the front end of the relay, it will be found that any appreciable change of the angle $\alpha_2$ will not occur until the fulcrum of the armature has passed the center of the relay, and as it approaches point 8' the rate of the angle augmentation increases. In order that a considerable difference between the length of travel at 7' and the length of travel 8' shall be obtained the fulcrum of the armature in the shown type of relay must then be positioned in the forward half of the relay, and the nearer to point 8' it is positioned, the greater becomes the angle $\alpha_2$ and the greater becomes the difference between the length of travel at 7' and the length of travel at 8'. The greatest angle would be obtained if the armature was pivoted at point 8', but then the inmost edge of the armature tongue would form a short circuit for the flux between the yoke 3' and the core 1', and for this reason there is a certain minimum distance from point 8' at which the fulcrum of the armature may be positioned in order that a favorable result shall be obtained. Furthermore, a saturation of the magnetic circuit may occur inwardly or to the rear of the armature, which will impair the result if the reluctance of air gap becomes too small.

It will be evident that the magnetic reluctance in the air gap between the armature tongue and the pole face of the core is considerably less in the relay shown in Figure 2 than in the known relay according to Figure 1. Accordingly the flux passing through the air gap for a given number of ampere-turns will be considerably greater in the relay or magnet of our invention according to Figure 2, but the ratio of the length of the lever arms to the derived force and the resultant of the magnetic attracting forces will be considerably enlarged, which necessitates a considerably greater resulting attracting force in order that the same force shall be obtainable at point 7' even if the center of attraction for the magnetic force is positioned at the same spot between points 7' and 8' as between points 7 and 8 in Figure 1. However, in fact this center of attraction has been displaced a considerable length towards the fulcrum or hinge area of the armature because the reluctance of the armature air gap is no longer constant along the whole extension of the armature tongue but decreases rapidly towards the fulcrum of the armature. This displacement becomes larger the larger the angle $\alpha_2$ and thus the shorter the armature. It will be still more marked since the attracting force is a square function of the magnetic flux, and for the armature angles involved the center of attraction for the attracting force, when the relay is non-operated, will be positioned relatively near to the point 8', if the parts are so proportioned that any appreciable saturation is not present.

In spite of the above-mentioned shortening of the lever arm for the resultant of the attracting forces a considerable increase of the torque is achieved due to the relatively greater increase of the resulting attracting force. It can be shown that if the length of travel 7' and the length 7'–8' of the armature tongue are kept constant, the following relation exists between the force obtainable at 7' and the length of the armature legs, i. e. the distance between point 8' and the fulcrum of the armature:

$$P = C(r+a) \ln \frac{r+a}{r}$$

where P is the force obtained at 7', C is a constant determined by the dimensions, number of ampere-turns etc. of the relay, r is the distance between point 8' and the fulcrum of the armature, and a is the length of the armature tongue, i. e. the distance between points 7' and 8'. As will appear from this equation, P will increase for a decrease of r and will grow very rapidly for small value of r. For very small values of r the formula does not hold, because a rapid decrease of the attracting force will then occur due to the shunt or short-circuit path, which will be provided between the yoke 3' and the core 1' by the edge of the armature tongue at 8'. Furthermore the eventual leakage and saturation have not been taken into account. In order that the formula shall represent the real conditions it is, of course, required that a is not too large in relation to the length of the core and that the magnetic reluctance in the armature tongue is substantially negligible in relation to the reluctance in the air gap. In practical tests very good results have been obtained with a relay having the following dimensions:

Length of core (from end to end) = 92 mm.,
Length of coil = 60 mm.,
Air gap at the outer end of the armature tongue = 0.95 mm.,
Thickness of residual stud located at the outer end of the armature tongue: 0.05–0.15 mm.,
Distance ($a$) between the outmost and inmost ends of the armature tongue = 14 mm.,
Distance ($r$) between the inmost end of the armature tongue and the fulcrum = 5 mm.
The air gap at the inmost edge of the armature tongue becomes then 0.25 mm.

Thus it has been shown above and in practice it has been found, contrary to the normal expectations of those skilled in the art that a considerably lower number of ampere-turns for one and the same armature load is required to operate the relay according to Figure 2 than to oprate the known relay according to Figure 1. Practical tests have shown that a reduction of the ampere-turns by 50% or more can be achieved without difficulty.

When the relay according to Figure 1 is operated, the attracting force increases as the armature approaches the pole face of the core, and when the armature is in operated position a very large excess of force and ampere-turns is present. The lever arm of the resultant of the attracting forces and the lever arm of the derived force are still practically of the same length, and the force required to make the armature release becomes substantially equal to the resulting attracting force in operated position.

In relays in general there is a certain residual magnetism, which remains after the cessation of the magnetizing current and which may cause that the relay does not release. The residual magnetism amounts usually to a certain percentage of the preceding magnetization, and this percentage increases rapidly with a decrease in the magnetic reluctance of the magnetic circuit involved. For this reason a residual stud or plate is used, which provides a predetermined minimum air gap between the armature and the core even when the relay is in operated condition. Thereby the magnetic reluctance in the magnetic circuit is increased so that the residual magnetism and also the excess of force is reduced. In telephone relays a thickness of the residual stud of 0.15 mm. is customary. However, in order that a certain required length of travel of the armature shall be achieved, the air gap between the armature in non-operated position and the core must be lengthened in a corresponding degree, i. e. so that the length of the air gap becomes equal to the sum of the length of travel and the length of the residual stud, which in turn involves an increase of the ampere-turns required to operate the relay and consequently an increase of the total current consumption of the relay.

When the relay according to the invention shown in Figure 2 is operated, the difference between the air gaps at the outmost end and the inmost end of the armature tongue is decreased. Accordingly the resultant of the attracting forces is displaced in a direction from the point 8' towards the center of the armature tongue, but even if this displacement should be considerable the lever arm of the force derived at 7' becomes relatively much longer than the lever arm of the resulting attracting force. Assuming thus that the same force acts at point 7' as at point 7 in Figure 1 the excess of force of the relay of our invention in operated condition will still be considerably less, and consequently it is not necessary to reduce the residual magnetism as much as in the prior relay of Fig. 1 in order that the release of the relay shall be ensured when the magnetizing current is interrupted. This circumstance in connection with the fact that the excess of ampere-turns and flux existing in the operated condition of the relay can be reduced by the invention, because it has been possible to reduce the number of ampere-turns required to operate the relay, will ensure proper function of the relay in release. Accordingly it is possible to reduce the pole gap in operated condition of our invention with the ensuing reduction of the number of ampere-turns required to operate the relay without hazarding any so-called freezing.

In this connection it may be mentioned that in the above dimensioned relay according to Figure 2 a residual stud having the thickness of 0.15 mm. was also used. However, it was positioned at the outmost edge of the armature tongue at the point 7' and the air gap along the edge at 8' was considerably less and only 0.04 mm. However the thickness of the residual stud is not in the same relation to the magnetic reluctance in the air gap when the relay is in operated condition as in the arrangement according to Figure 1, and the same effect is obtained as if the residual stud had been made thinner.

The relay according to the invention may also be proporportioned in such a way that the armature during operation is saturated adjacent to the edge of the armature tongue at 8', which saturation spreads towards the edge at 7' as the armature moves towards the pole face of the core 1'. This results in an increased displacement of the attraction center of the attracting forces towards point 7' on operation of the armature, so that the force obtainable at 7' may be of the same or nearly the same order as the resultant of the attracting forces. Such a local saturation may be maintained also when the armature is in operated position for instance by causing the air gaps at the inmost and outmost edges of the armature tongue to be of different length even in that position (in the same manner as in the practical embodiment described above) and this effect may be attained by choosing proper dimensions of the armature and suitable material for the same, by forming the armature tongue with an outwards increasing thickness and so on. This successive lengthening of the lever arm for the attracting force permits a considerable increase of the armature load at the end of the travel of the armature as is required for instance when the contact pressure for a number of make contact functions is built up during the very last portion of the armature movement, which is often the case.

When the magnetizing current is interrupted the saturation rapidly ceases, and then the resultant of the attracting forces "wanders" towards point 8', so that the resultant of the attracting force produced by the residual magnetism will have a relatively short lever arm, and then the armature load becomes predominant and the relay is released.

When the relay according to the invention is made to operate in this way a very short residual stud may be employed and in certain cases the residual stud may even be omitted.

If it is desired that the above-mentioned effect by local saturation shall be particularly prominent the pole face of the magnet core may be made relatively narrower and/or the width of the operative surface of the armature tongue as measured in a direction parallel to the rotation axis of the armature may be made relatively smaller. In order to maintain a sufficient area of the magnet core and/or the armature tongue these parts may be made with a rectangular or other elongated cross section and with the effective pole face located at one of the surfaces represented by a short side of the cross section. When an armature designed in this manner is used the intended effect is mainly based upon saturation in that surface of the armature tongue which faces the pole face.

The saturation process may also be encouraged by the use of a thinner armature tongue so that a saturation extending wholly or partially over the cross section of the armatures arises in the flux paths, which are substantially parallel to the rotation axis of the armature. The shape of the armature will permit such a saturation to arise without obstructing appreciably the magnetic flux to parts of the armature, which are located farther away from the rotation axis. Of course, it is necessary that the legs of the armature and parts of the armature located adjacent to the said legs are given such dimensions that no appreciable saturation will arise in them.

All the above-mentioned advantages have been achieved by arranging the armature in such a manner with respect to the rest of the magnetic circuit that the length of travel of the inmost edge of armature tongue is considerably shorter than the length of travel of the outmost edge of the armature tongue. In the previously mentioned exemplary relay the lengths of travel at the outmost edge of the armature tongue was 0.8 mm. (air gap 0.95 mm.—residual stud 0.15 mm.) and the length of travel at the inmost edge of the armature tongue 0.21 mm. (air gap 0.25 mm.—pole gap in operated position 0.04 mm.) and thus the ratio of the said lengths of travels was about 1:4. However, tests have shown that the advantages of the invention will be present already when the said ratio is 1:1.25.

This is achieved by making the armature with a considerably shorter radius of rotation in relation to the length of the operative surface (between 7' and 8' in Figure 2) than has previously been the case in relays of corresponding type.

Short armatures have also been provided in relays of the Kellog type, although not with the same purpose as in the present invention, but any appreciable advantages in the respect concerned have not been obtained because the magnetic leakage between the core and the yoke becomes very large if the distance between that edge of the pole face, which faces the fulcrum of the armature, i. e. the yoke, and the fulcrum is kept small. Furthermore the core of these relays has a circular cross section, which results in that the attracting surface nearest to the fulcrum of the armature becomes small and ineffective. Thus the fundamental idea of the invention has not even unintentionally been utilized to these relays of the Kellog type.

In order that it shall be possible to make the armature short enough without the distance between those points on the rigid magnetic circuit, which are represented in the shown embodiment by the end of the core on one hand and the ends of the legs of the yoke 3' on the other hand being so small that a considerable leakage will arise the armature is designed in accordance with the invention in such a manner that an essential portion of the flux passing through the same is guided roughly parallel with the rotation axis of the armature as distinguished from relays of the Kellog type in which the flux path in the armature forms substantially a right angle with the rotation axis of the armature. This arrangement according to the invention makes it possible to place core and yoke portions side by side with each other in relation to the symmetry plane of the relay and to keep the distance large between the free ends of the rigid magnetic system.

The principle of design illustrated by Figure 2 provides a plurality of other advantages.

The moment of inertia of the armature is small and hence its acceleration becomes great.

Since the length of the armature from the rotation axis or turning area is small, an effective variation of the lever arm of the armature load may be accomplished by a slight displacement of the point of application of the derived force, for instance by a displacement of a contact spring assembly and the lifting stud associated therewith in its longitudinal direction along the relay bridge or, as will be shown below, by displacing the armature perpendicularly to its rotation axis with respect to such a contact spring set. This is particularly useful when it is desired to obtain a delayed release or else when it is desired to accommodate the force derived from the armature to the existing load conditions.

The legs of the yoke 3' may readily be made with relatively large area of cross section, and since the armature legs are short and the armature tongue presents a relatively low magnetic reductance, a magnetic circuit of very good quality and with small losses can be obtained.

The legs of the yoke 3' may also extend somewhat ahead of the fulcrum of the armature and eventually up to end plane of the core whereby a good magnetic passage between the said legs and the armature is ensured. If these extensions of the legs are arranged on the same side of the armature as the pole face of the core, the desirable leakage flux passing between the armature and the extensions will positively contribute to the total force acting on the armature.

Other advantages provided by the invention will be stated in connection with the more detailed construction examples to be described below.

Figure 3:
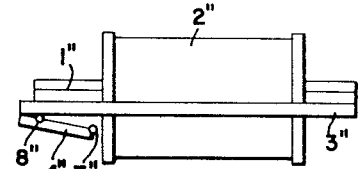
Figure 3 shows, likewise in point of principle, a relay according to the invention of a modified design for comparison with the relays according to Figures 1 and 2.

In Figure 3 a modification of the relay according to Figure 2 is shown in principle. The designations 1", 2" etc. indicate parts corresponding to those designated 1', 2' etc. in Figure 2. The legs of the yoke 3' are extended a distance ahead of the end plane of the core 1", and the armature 4" is pivoted at the end of these legs so that that edge of the armature tongue at 7", which is located nearest to the winding 2", has the greatest length of travel while the smallest "fractional air gap" is positioned at 8', i. e. at the end of the core.

However, this design will not result in such a considerable reduction of the current consumption as the arrangement described in conjunction with Figure 2. This is due to the fact that it cannot be avoided that a portion of the flux is lost in the path up to the shortest part at 8" of the air gap because of leakage, and since this part of the air gap has to be the most effective one if the effect of the invention shall be fully utilized, the number of ampere-turns required for operation of the relay will certainly be increased.

In operated condition of the relay the attraction center of the attracting forces will further be located nearer to the end of the armature, i. e. it will get a longer lever arm at the same time as the displacement of the attraction center during the operation movement of the armature may be less, and therefore the excess of ampere-turns in operated condition will be relatively large, which in turn will promote the tendency of sticking.

In spite of the above-mentioned disadvantages of the design it can be carried out so that it shows better qualities than previously known relay structures.

The fundamental principles of the invention having now been explained, some practical embodiments of relays according to the invention will be described below in conjunction with the Figures 4–28.

All the shown embodiments comprise the following main elements: An armature, a winding coil, a magnet core surrounded by the coil, and a yoke being connected with the core and having legs, which extend towards the armature end of the relay on either side of the coil, and at the former ends of which the armature is pivoted.

In Figures 4–7 the armature is designated 9, the winding coil 10, the magnet core 11, and the yoke 12. The same designations have been used in Figure 8 but here the coil has been omitted in order that the design of the magnetic circuit shall appear more clearly.

The armature 9 has the form of a plane U-shaped member having relatively short legs, which extend on each side of the coil 10. The armature has a highly flattened rectangular cross section.

The magnet core 11 and the yoke 12 are preferably made in one piece, for instance by stamping sheet iron, so that the magnetic reluctance in the joint between these parts becomes as small as possible. These parts also have a flattened rectangular cross section. The yoke 12 is at the rear provided with a threaded pin 13 intended for the mounting of the relay. In order that a sufficient area of the magnet core shall be obtained a couple of plates 14 of ferromagnetic material are applied to the core 11. The dimensions concerned should preferably be chosen so that the area of the core body will be equal to or of the same order as the total area of the legs of the yoke 12.

In this connection it may be mentioned that in previously proposed and used relay structures having a core body consisting of a plurality of laminations, the armature has been so arranged in relations to the core as to be attracted towards the short ends of the laminations. This made it necessary to subject the core to an expensive working (fine grinding) since otherwise a sufficiently plane pole face could not be obtained.

Since in the relay according to the invention the effective pole face is located on a flat side of the core 11, which is plane by itself, any after-working is thus not required, although the core 11 and the plates 14 form a laminated core body.

The number of plates 14 is, of course, optional and may be chosen according to the circumstances.

The legs of the armature 9 are each formed with an edge 15 fitting into corresponding recesses 16 in the legs of the yoke 12. The armature is held in its position partly by angle pieces 17 attached to the legs of the yoke 12 and partly by a resilient wire bow 18, which by means of screws 19 and 19' is also attached to the legs of the yoke 12, and is bent down in front of the end of the armature, whereby a displacement of the armature in forward direction is prevented. The screws 19 and 19' in the shown embodiment also hold the angle pieces 17. The latter are so shaped that they keep the ends of the armature legs in all positions of the armature relatively close to the legs of the yoke 12, although not so as to obstruct the movement of the armature. As will be seen from the above and the drawing the armature is thus restrained in all directions without any actual journal being provided. At the same time an efficient magnetic joint is secured in the fulcrum and if any considerable magnetic reluctance should arise in the fulcrum (due to air gap or saturation) the flux may spread over the total surface of the legs of the armature because the legs of the yoke 12 extend a considerable length ahead of the fulcrum. A certain portion of the flux passing to the armature tongue is likely to pass this way in most cases, and then an attraction on the legs of the armature will arise, which will promote the movement of the armature during operation.

It may seem to be advantageous to extend the legs of the yoke 12 up to the vertical plane passing through the front edge of the armature. However, with such an extension of these legs a leakage flux is apt to arise between these and the pole face of the core 11, which may reduce the sensitivity of the relay. The length of the extended portions of the legs should therefore be determined in view of this, for instance by experiments, and will be dependent on such factors as the perpendicular distance between the core 11 and the legs of the yoke 12, the area of the surfaces facing each other and so on.

In the shown arrangement the leakage between the said parts is relatively small due to the plane form of the parts and the fact that surfaces of the parts facing each other have a relatively small extension.

An important feature of the shown embodiment is that, since the armature as well as the E-shaped core member 12 are plane, the pivotal axis of the armature will coincide with the line of intersection between the attracting face of the armature and the pole face of the leg 11, which has shown to impart to the relay a maximum of sensitivity.

The angle of travel of the armature 9 is governed by a tape-shaped bow 20, which at one end is secured to the core and the other end of which forms a stop against which the armature abuts in non-operated position. In the described embodiments of the invention an angle of travel of at least 1.5° and preferably 2.5° or more has proved advantageous for obtaining a good sensitivity of the relay.

In order that sticking of the armature shall be prevented a pole plate 21 is provided at the foremost edge of the armature.

Contact spring sets consisting of a number of fixed and movable contact springs 22, which are separated by insulating spacers 23, are fastened by screws 24 to the legs of the yoke 12. The movable contact springs in each contact spring set are actuated by an actuating stud 25, while the fixed contact springs rest upon a supporting stud 26. The respective actuating stud 25 rests by its lower end upon the armature 9 so that the movable contact springs are actuated when the armature is moved.

It will be noted that, while in known flat type relays the legs of the armature ordinarily are much longer than the legs of the core member, on which they are pivotally mounted, the shown relay has armature legs, which are shorter than the side legs of the core member.

In connection with the description of Figures 1–3 it was assumed that the application point of the armature load on the armature was located just at the front edge of the armature.

Figure 5:
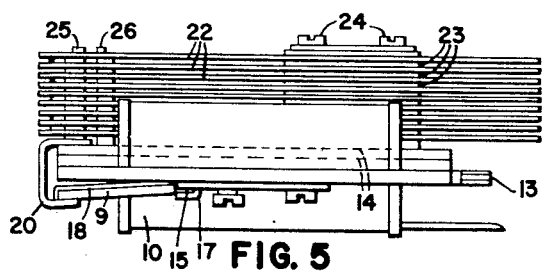
Figure 5 shows the same relay in side view.
Figure 6:
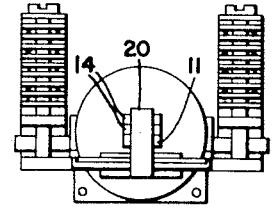
Figure 6 shows the same relay in end view as seen from one end (the armature end).
Figure 7:
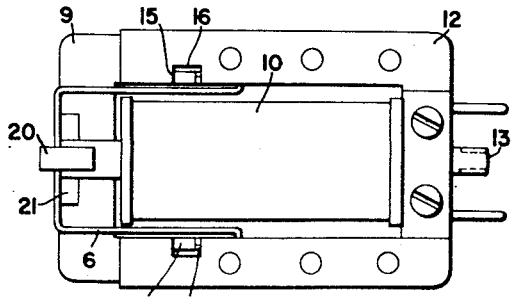
Figure 7 shows the same relay in plan view.
Figure 8:
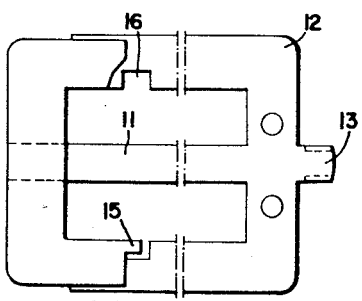
Figure 8 shows in plan view the magnetic circuit of the same relay comprising core, bridge portions and armature.
Figure 9:
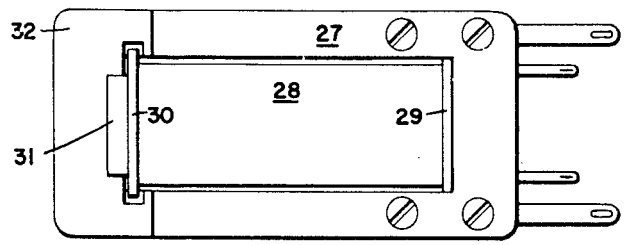
Figure 9 shows another embodiment of a relay according to the invention in bottom view.

As will be seen from Figure 5 the relay illustrated therein is designed so that the stud rests upon the armature at some distance from the outer edge of the armature. It will easily be understood that this change of the lever arm of the load involves an altered relation between the attracting force and the force derivable from the armature but also a change of the relation between the angle of travel of the armature and the amount of movement derived from the armature. The relative location of the abutment point of the stud should therefore be chosen, preferably experimentally in dependence of dimensions concerned and in view of the required functions and properties of the relay so as to give the desired effect. If the location of this point is as shown in Figures 5 and 6, the force derivable from the armature will always be less than the resulting attracting force. In another case, however, it may be advantageous that the derivable force is always greater than the attracting force, and in still another case the most favorable effect may be obtained if, depending on the previously mentioned displacement of the attraction center of the attracting forces, the derivable force at the beginning of the travel of the armature is equal to or less than the resulting attracting force, while, when the armature is in operated position, it is greater than the resulting attracting force.

Of course a relay according to the invention may under different conditions and for different purposes be given different designs having different locations of the actuating stud.

Since however, as has been mentioned above, very slight displacements are sufficient to bring about a considerably changed effect, an adjustment of the location on the armature of the actuating stud of the respective spring set within whole or part of the possible variation range may be facilitated simply by arranging the contact spring sets so as to be longitudinally displaceable along the legs of the yoke 12. Of course, a relay designed in this manner will have a widely increased range of use and it will then be necessary to make a relay of one or a few standard types only.

The relay design shown in Figures 9–14 is in many respects similar to that shown in Figures 5–8 but shows also certain important modifications especially as regards the manner of supporting the armature.

Figure 13:
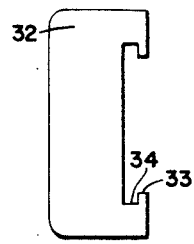
Figure 13 shows in plan view the armature of the relay shown in Figures 9–12.
Figure 10:
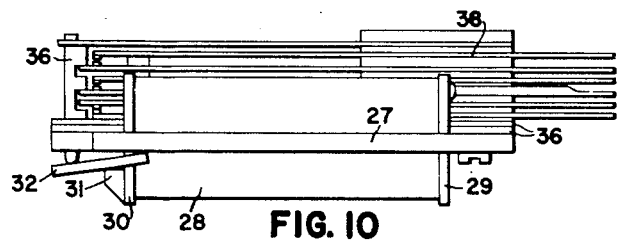
Figure 10 shows the same relay as Figure 9 in side view.
Figure 11:
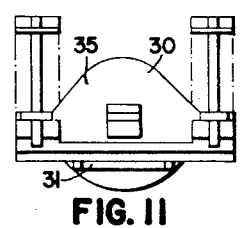
Figure 11 shows the same relay as Figure 9 in end view as seen from one end (the armature end).
Figure 12:
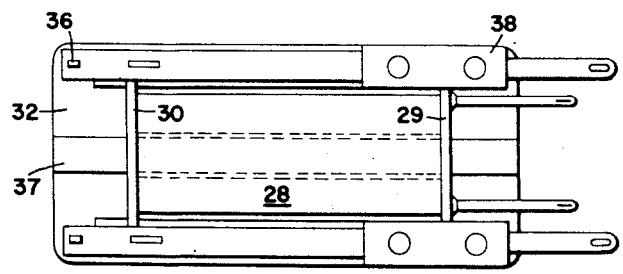
Figure 12 shows the same relay as Figure 9 in plan view.
Figure 14:
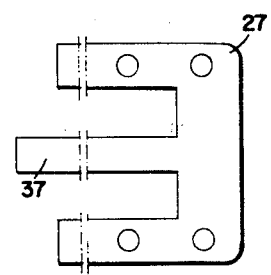
Figure 14 shows in plan view the rigid portion of the magnetic circuit of the relay according to Figures 9–12.

The yoke 27 and the core 37 integral therewith forms, just as in the preceding embodiment, an E-shaped member the center leg of which, i. e. the core, is longer than the side legs. Also in this case the area of the core is enlarged by means of iron plates 36 applied to the core. The coil 28 is wound on a bobbin having end pieces 29 and 30. The end piece 30 is formed with two projections 35, which form stop faces abutting against the legs of the yoke 27. Preferably the core 37 is bent somewhat downwards in manufacture so that the stop faces of the projections 35 in mounted position are held under pressure against the legs of the yoke 27 by virtue of the spring tension of the core, whereby the position of the coil 28 in longitudinal direction on the core 37 is fixed. Furthermore, the projections 35 prevent the core from being bent towards the armature on magnetization. In this design the armature is made with very short legs which, as will be seen from Figure 13, are at their ends provided with projections 33 so as to form recesses 34.

On the end piece 30 there is further provided a shoulder 31, and before the coil 28 is pushed upon the core 37 at the assemblage of the relay the armature 32 is pushed down over the end piece 30 so that a couple of additional projections, not shown on the drawing and located under the projections 35, will fit into the recesses 34 of the armature, the latter thus being made abut against the shoulder 31.

When one or more contact spring sets 38 are mounted on the relay, the actuating stud of each contact spring set will exert a pressure upon the outer edge of the armature, and then the edge of the shoulder 31 will serve as a tilting edge, so that the ends of the armature legs will be pressed against the legs of the yoke 27. Hereby a good magnetic joint is secured at the fulcrum of the armature in non-operated position. When the armature is operated so that it leaves the edge of the shoulder 31 a good magnetic joint is still maintained partly by the attracting force exerted by the pole face of core 37 and partly by magnetic attraction between the legs of the armature 32 and the legs of the yoke 27.

In this embodiment a change or adjustment of the lever arm of the armature load may be easily brought about by displacing the coil 28 along the core whereby, as will be easily understood, the armature 32 will also be displaced in a direction perpendicular to its axis of rotation, whereby the distance between the latter and the abutting points of the actuating stud becomes changed.

Figures 15, 16:
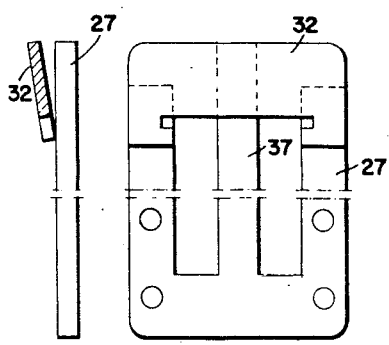
Figure 15 shows in side view an embodiment of the magnetic circuit of a relay according to the invention.
Figure 16 shows the magnetic circuit according to Figure 15 in plan view.

In Figures 15 and 16 the magnet circuit of the embodiment shown in Figures 9–14 is further illustrated. In fact it is analogous to that used in the previously described embodiment.

The fundamental principle of this magnet circuit is that the core 37 and the side legs of the yoke 27 are positioned in the same plane, the required air gap between the inmost edge of the armature 32 and the core being brought about by forming the armature with legs so that its axis of rotation will be located behind the rear boundary line of the armature tongue.

Figures 17, 18:
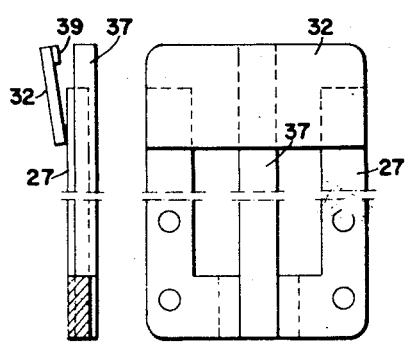
Figure 17 shows in side view another embodiment of the magnetic circuit in a relay according to the invention.
Figure 18 shows the magnetic circuit according to Figure 17 in plan view.

In the magnetic circuit according to Figures 17 and 18 the necessary air gap adjacent to the rotation axis of the armature is obtained in another way. In this case the armature 32 has no legs, and instead the side legs of the yoke 27 are displaced into another plane which is substantially parallel with the pole face of the core. At 39 a pole plate is shown, the purpose of which is to ensure a certain air gap in operated condition of the relay and at the same time to prevent the armature from tilting about the front edges of the side legs of the yoke 27. If the latter are extended a sufficient length ahead of the fulcrum of the armature the pole plate (or residual stud) may be omitted, since, in such case, the ends of the side legs of the yoke 27 will prevent the armature from touching the pole face of the core.

It is particularly remarkable that in this embodiment the inmost boundary line of the effective surface of the armature coincides with the turning axis of the armature, which as a result of which the air gap at this place is substantially constant.

In special cases a tilting motion of the armature around the front edges of the legs of the yoke 27 may be desirable whereby a modified attracting force characteristic of the magnet is obtained.

The embodiment shown in Figures 17 and 18 may be modified, under maintenance of the characteristics of the invention in that the side legs are bent upwards to such extent that their planes become located at a considerable distance from the plane of the core 37, the pole face of the core extending preferably at right angles towards the plane of the side legs and the armature extending from the legs of the yoke 27 substantially at right angles with these and towards the plane of the core. Such a design may be advantageous in point of space. Thus for instance the relay may be made shorter with unchanged winding space, and further the space in vertical direction may sometimes be better utilized for receiving contact spring sets. In order that a better utilization of the space in vertical direction shall be achieved, it is however required that the contact spring sets are mounted on that side of the side legs, which faces the plane of the core, and then normally such arrangement is required that the armature will act pulling instead of pushing, as is usually the case, on the actuating studs of the contact spring sets or corresponding arrangements.

From a view of operation a magnet designed according to this principle is nearest comparable to that shown in Figure 3, and since the armature has its least length of travel at the outer edge of the core and not, as would be desirable, nearest to the winding, this arrangement is not likely to be as favorable as the other arrangements described herein.

Figure 19:
Figure 19 shows in side view still another embodiment of the magnetic circuit in a relay according to the invention.
Figure 20:
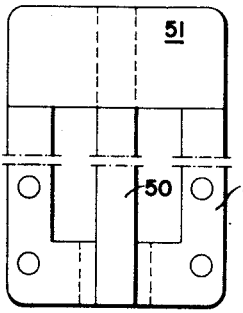
Figure 20 shows in plan view the magnetic circuit according to Figure 19.

In the modification shown in Figures 19 and 20 of the magnet circuit of a relay according to the invention the legs of the yoke 49 and the core 50 are also positioned in different planes, but in this case the armature 51 abuts with its inmost edge against the ends of the side legs of the yoke 49 so that an abutting joint is formed.

On the armature 51 there is provided a pole plate 52.

Figure 21:
Figure 21 shows in side view a further embodiment of the magnetic circuit according to the invention.
Figure 22:
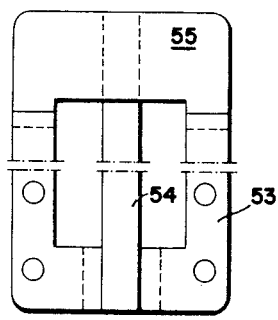
Figure 22 shows in plan view the magnetic circuit according to Figure 21.
Figure 23:
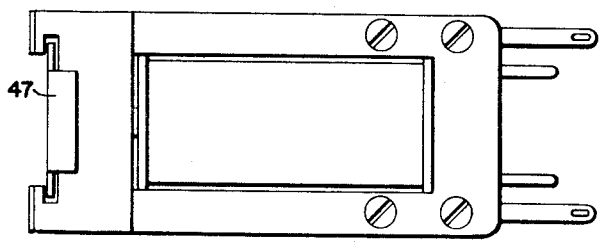
Figure 23 shows still an embodiment of a relay according to the invention in bottom view.
Figure 27:
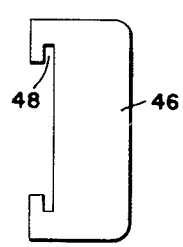
Figure 27 shows in plan view the armature of the relay shown in Figures 23–26.

In the magnetic circuit in Figures 21 and 22 the side legs of the yoke 53 on one hand and the core 54 on the other hand are also located in different planes. The armature 55 which has short legs is here journalled at the underneath side of the side legs of the yoke 53. The necessary air gap in operated condition of the relay is effected by means of a pole plate 56.

In all the shown embodiments the armature has been plane, while either the yoke and the core have been positioned in different planes or the armature has been provided with legs in order that too small an air gap or short circuit adjacent to the fulcrum of the armature shall be avoided.

A similar effect can be obtained solely or in combination with these embodiments by positioning the armature surface coacting with the armature in another plane than the remaining part of the armature, for instance by providing the armature with a recess or a band adjacent to the pole face of the core or by forming it in some other way, so that the parts of the armature which are positioned adjacent to the side legs of the yoke will be in another plane than the part of the armature coacting with the pole face of the core.

Furthermore, the magnetic circuits may be modified so that the armature extends substantially at right angles from the legs of the core, and, in addition, the pole face of the core extends substantially at right angles from the core in the same direction as the armature, whereby the magnet as a whole becomes shorter. This modification shows certain resemblances to the previously described modification of the magnetic circuit in Figures 17 and 18.

Since, however, in this case that portion of the air gap, which is located nearest to the fulcrum of the armature, will be positioned nearest to the winding, this embodiment is more advantageous in view of operation. As to the possibility of saving in a vertical direction the same applies as has been said about the previously described modification.

In Figures 23–28, finally, an embodiment of a relay designed in accordance with the principle illustrated in Figure 3 is shown.

In this case the side legs of the yoke 40 are longer than the core as appears from Figure 28. The coil 41 is also in this case wound on a bobbin having end pieces 43 and 44 the latter of which is provided with projections 45 which abut against the side legs of the yoke 40 and thus fix the position of the coil on the core in the same manner as in the arrangement shown in Figure 11. Likewise the area of the core is enlarged by means of sheet iron plates 42.

Figure 24:
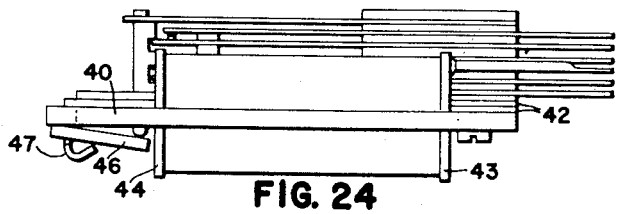
Figure 24 shows the same relay as Figure 23 in side view.
Figure 25:
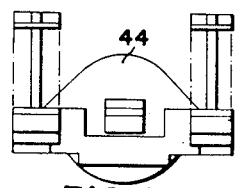
Figure 25 shows the same relay as Figure 23 in end view as seen from one end (the armature end).
Figure 26:
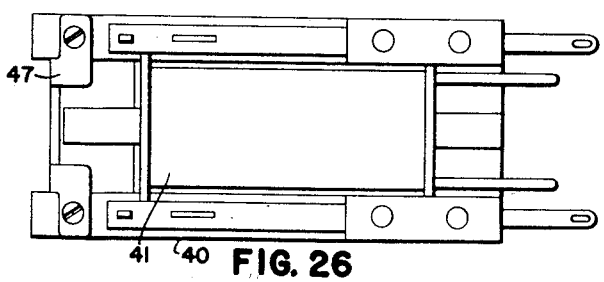
Figure 26 shows the same relay as Figure 23 in plan view.

At the outer edges of the legs of the yoke 40 a bent guiding plate 47 is fastened by screws. It is made of non-magnetic material and is formed at the lower end with a bent-in edge (Figure 24). The armature is provided with recesses 48 at the inside of the armature legs, and these engage the side edges of the guiding plate 47. The said bent-in edge of the guiding plate 47 serves as a tilting edge for the armature, which is made subject to pressure from operating means, such as the actuating stud shown in the figure, belonging to contact spring sets mounted on the side legs of the yoke 40, so that the armature legs are pressed against the legs of the yoke 40 under a considerable pressure, and thus an efficient magnetic joint in non-operated position of the relay is ensured.

When the armature is attracted, the pressure of the armature legs against the legs of the yoke 40 is maintained partly by the force exerted by the pole face upon the armature and partly by attraction between the armature legs and the legs of the yoke 40.

Of course, the invention may be varied and modified in many ways without departing from the fundamental idea of the invention.

Thus for instance, instead of or in combination with a pole stud (residual stud) or pole plate arranged to abut the pole face of the core one or more pole studs or pole plates may be arranged adjacent to the points where the armature abuts against the legs of the yoke.

In the shown and described embodiments of Figures 1–28 the magnetic circuit is further symmetric with respect to the longitudinal axis of the core magnetically as well as geometrically. Although favorable, such an arrangement is, of course, not necessary, and instead one leg of the yoke, for instance, may be replaced with a member of non-magnetic material for supporting the armature, also, the winding coil may be arranged at some other part of the magnetic circuit and may eventually be divided and distributed on two or more such parts. For example, referring to Figure 29 in the drawings, the magnetic circuit may comprise a field structure 60 having magnetic core leg 62 and magnetic return leg 64 extending forwardly from a transverse connecting magnetic yoke portion 66, with a third leg 68 of non-magnetic material, such as brass, suitably secured to said magnetic field structure as at 70 by any suitable means, such as by brazing or rivets or the like. As in the embodiments of Figures 1–28 above-described, a short armature 72 having shanks 74 completes the magnetic circuit and the electromagnet winding coil would preferably be mounted on core leg 62.

By making the core and the yoke in one piece, as has been done in the described embodiments, the magnetic reluctance in the rigid magnetic circuit can be kept low. Of course it lies within the scope of the invention to make the rigid magnetic circuit in several parts, which are assembled in a suitable manner.

In for instance the embodiments of the magnetic circuit shown in Figures 17–22, the level difference between the side legs of the armature and those of the yoke can be brought about by means of separate sheet iron pieces applied to a frame made in one piece, or by assembling the magnetic circuit in other way from suitably proportioned parts. Furthermore it is possible, although ordinarily with a less favorable result, to journal the armature on the core and to provide a pulling air gap at the side legs of the yoke instead.

The arrangements shown in Figures 4–7, 9–13 and 23-27 have been carried out with good result in practice with the shown dimensions apart from some small details (length of travel, pole gap) which have been modified in the figures for the sake of clearness. The mutual proportions of the parts as shown in these figures may therefore be considered as representative to embodiments of the invention.

The terms "an effective axis" or "a line" when used in the claims with reference to angular armature movement refer to the transverse line or axis about which the electromagnet armature moves angularly to attracted position adjacent the core pole surface and is generic to such axis or line whose longitudinal position relative to the electromagnet core leg remains fixed during such angular armature movement and to such axis or line whose longitudinal position relative to the core leg shifts during such angular armature movement.

The terminology "at the commencement of angular armature movement to attracted position" when used in the claims refers to the condition existing when substantially the entire armature including the entire pole portion begins to move angularly towards the core leg pole surface to attracted position adjacent thereto about the "effective axis" or "transversely extending line."

The invention has been described above as applied to relays. However, it will be evident that the fundamental principles of the invention may be generally applied to control magnets for widely different purposes.

We claim:

1. An electromagnet comprising: a magnetic field structure having a yoke portion with an elongated core leg longitudinally extending forwardly therefrom, and at least one magnetic return leg extending forwardly therefrom in spaced relation to said core leg defining a gap therebetween; said core leg having a substantially plane pole surface substantially parallel to the longitudinal axis of said core leg; coil means on said field structure for magnetizing said core pole surface and said return leg to different magnetic potentials when energized to establish a magnetic flux therebetween; a magnetic armature having a pole portion with a substantially plane attracting surface extending transversely to said core leg axis and facing said core pole surface with a working air gap therebetween, said armature and said field structure forming a magnetic circuit with the armature providing a flux path between said core pole surface and said return leg transverse to said longitudinal core leg axis; means supporting said armature for angular movement to attracted position adjacent said core pole surface substantially about an effective axis extending transversely to said core and return legs within the forward half of said magnetic circuit; means for providing at said working gap at the commencement of angular armature movement to attracted position and at least until substantially the completion of such movement at least the minimum effective non-magnetic spacing between said armature pole portion and said core pole surface sufficient to avoid substantial short circuiting of said flux between said core pole surface and said return leg through said armature, with said means also providing at said commencement of angular armature movement an air space between the core pole surface and armature attracting surface which increases in the direction of said longitudinal core axis from said effective spacing at its end nearest said effective axis to at least 1.25 times greater spacing at its other end.

2. An electromagnet as defined in claim 1, wherein said spacing nearest the effective axis approximates the minimum effective non-magnetic spacing sufficient to avoid substantial short circuiting of said flux through the armature.

3. An electromagnet as defined in claim 1, wherein said transversely extending effective axis substantially coincides with the line of intersection between said core pole surface and armature attracting surface at said commencement of angular armature movement to attracted position.

4. An electromagnet as defined in claim 1, wherein the longitudinal position of said transversely extending effective axis relative to said yoke portion remains substantially fixed during said angular movement of the armature to attracted position.

5. An electromagnet as defined in claim 1, wherein said second-recited means provides for unjournalled angular movement of said armature to attracted position.

6. An electromagnet as defined in claim 1, wherein said transversely extending effective axis lies between said field structure yoke portion and the longitudinal midpoint of said armature pole portion.

7. An electromagnet as set forth in claim 1, wherein said means for providing at least minimum effective spacing comprises at least one member extending from said armature pole portion substantially perpendicular to said transversely extending axis and disposed adjacent said return leg so that it reacts against the same during said angular armature movement, with said extension member being of sufficient length to provide at least said minimum effective air gap spacing when the armature is at said commencement of angular movement to attracted position.

8. An electromagnet as set forth in claim 7, wherein said extension member is magnetic and reacts directly against said magnetic return leg in magnetic contact therewith during said angular armature movement to attracted position.

9. An electromagnet comprising; a magnetic field structure having a yoke portion with a central elongated core leg longitudinally extending forwardly therefrom, with first and second outer magnetic return legs longitudinally extending forwardly therefrom each in spaced opposed relation to said core leg; said core leg having a substantially plane pole surface substantially parallel to the longitudinal axis of said core leg; coil means on said core leg for magnetizing said pole surface thereon to a different magnetic potential from each of said return legs to establish a magnetic flux between said pole surface and each return leg; a magnetic armature having a pole portion with a substantially plane attracting surface extending transversely to said core leg axis and facing said core pole surface with a working air gap therebetween, said armature and said field structure forming a magnetic circuit with the armature providing a flux path between said core pole surface and said return legs transverse to said longitudinal core leg axis; means supporting said armature for angular movement relative to said pole surface between retracted position spaced therefrom to attracted position more closely adjacent thereto substantially about a line extending transversely to said core and said return legs within the forward half of said magnetic circuit with said armature reacting against said return legs at the commencement of its angular movement to attracted position; means for providing at least minimum effective non-magnetic spacing between said armature pole portion and said core pole surface sufficient to avoid substantial short circuiting of said flux between said pole surface and return legs through said armature at the commencement of said angular armature movement to attracted position and until substantially the completion thereof; said armature pole portion having first and second longitudinally spaced boundaries with said first boundary closer to said transversely extending line than said second boundary; and means for providing at said working gap at said commencement of angular armature movement to attracted position an air space between said core pole surface and said armature attracting surface which increases from at least said minimum effective spacing adjacent said first armature boundary to at least 1.25 times greater spacing adjacent said second armature boundary.

10. An electromagnet as defined in claim 9, wherein: said core leg is longer than said coil means with the forward end thereof projecting forwardly beyond the coil; and said second-recited means provides for angular armature movement to attracted position about a transversely extending line lying between said forward end of the core leg and the longitudinal mid-point of said coil means.

11. An electromagnet as defined in claim 9 wherein said second-recited means provides for angular armature movement to attracted position about a transversely extending line lying between the longitudinal midpoint of said core leg and its forward end.

12. An electromagnet as defined in claim 9 wherein said transversely extending line substantially coincides with the line of intersection between said core pole and armature attracting surfaces at the commencement of said angular armature movement to attracted position.

13. An electromagnet as defined in claim 9, wherein the longitudinal position of said transversely extending line relative to said yoke portion remains substantially fixed during said angular armature movement to attracted position.

14. An electromagnet as defined in claim 9, wherein said armature supporting means supports said armature for unjournalled angular movement to attracted positions.

15. An electromagnet as defined in claim 9, wherein said transversely extending line lies between said field structure yoke portion and the longitudinal mid-point of said armature pole portion.

16. An electromagnet as defined in claim 9, wherein; said magnetic field structure is a flat open-ended, generally E-shaped magnetic structure.

17. An electromagnet as defined in claim 9, wherein said means for providing said minimum effective spacing comprises first and second spaced shanks projecting from said armature pole portion one each substantially overlying a part of one of said return legs, with said shanks reacting against said return legs during said angular armature movement substantially along a line substantially coincident with said above-mentioned transversely extending line, and said shanks being at least of sufficient length to provide at least said minimum effective air gap spacing when the armature is at the commencement of said angular movement.

18. An electromagnet as defined in claim 17, wherein said shanks are magnetic and react directly against said field structure return legs in magnetic contact therewith during said angular armature movement to attracted position.

19. An electromagnet as defined in claim 17, wherein said armature shanks are shorter in length than said return legs.

20. An electromagnet as defined in claim 17, wherein said armature shanks are shorter than the distance between said first and second boundaries of the armature pole portion.

21. An electromagnet as defined in claim 9, wherein said armature is substantially flat and has a substantially linear transversely extending boundary including bearing portions reacting at said commencement of angular armature movement against said return legs in magnetic contact therewith substantially along a line which substantially coincides with the above-mentioned transversely extending line.

22. An electromagnet as defined in claim 21, wherein said means for providing at least minimum effective spacing includes bends in said field structure displacing said central core leg pole surface relative to said return legs sufficient to provide said minimum effective non-magnetic spacing between said armature attracting surface and said core pole surface.

23. An electromagnet as defined in claim 9 wherein said minimum effective spacing between armature pole portion and core pole surface at commencement of angular armature movement is approximately 0.25 millimeters.

24. An electromagnet as defined in claim 9, wherein said minimum effective spacing between armature pole portion and core pole surface is less than 0.25 millimeters.

25. An electromagnet as defined in claim 9, wherein said minimum effective spacing between said armature pole portion and said core pole surface is at least 0.25 millimeters.

26. An electromagnet as defined in claim 9, wherein the armature is loosely supported for movement relative to the field structure and the means recited therein provide the recited conditions of minimum effective spacing, wedge-shaped gap, and armature reacting against said return legs at said commencement of angular armature movement to attracted position as a result of initial energizing of said coil means.

27. An electromagnet as defined in claim 9, wherein: said return legs terminate longitudinally adjacent said core pole surface and have coplanar surfaces substantially parallel to said core axis; said armature is substantially flat and U-shaped with first and second spaced magnetic shanks extending rearwardly from the armature pole portion towards said yoke portion on either side of said coil means with surfaces lying in a common plane and facing said coplanar surfaces of said return legs in overlapping relation; and each of said magnetic return legs extends forwardly along substantially the major portion of the length of said overlapping shanks so that each armature shank is in magnetically coupled relation along the major portion of its entire length with its associated return leg providing an extensive area for flux passage therebetween.

28. A control magnet device as recited in claim 9, wherein said last-mentioned means and armature supporting means comprise: a spring member disposed on said field structure retaining said armature in longitudinal position relative to said field structure; means on said electromagnet biasing said armature to retracted position independently of said spring member; and stop means on said field structure with a portion thereof engaging said armature in retracted position to control spacing of said armature relative to said core at said commencement of angular armature movement to attracted position.

29. An electromagnetic device comprising: a magnetic field structure comprising a substantially straight elongated magnetizable core; an operating winding coil disposed on said core for magnetization thereof, said winding coil being positioned with respect to said core so that one end of the core projects beyond said coil, with said projecting end having a substantially plane core pole surface extending substantially parallel to the longitudinal axis of said core; said field structure further comprising a magnetizable return member magnetically connected to the end of said core opposite said pole surface end through a path of low reluctance, said return member comprising two return legs extending substantially parallel to said core in opposed relation thereto and adjacent to said coil; said return legs terminating adjacent said pole face end of said core with each having a plane surface in proximity to said core pole face surface and substantially coplanar therewith; a substantially flat relatively short magnetic armature comprising a pole portion disposed transversely of said core pole surface and having a substantially plane attracting surface facing said core pole surface in magnetically attractable proximity thereto, and a pair of spaced short shanks extending therefrom one each substantially overlying said return legs, said armature and field structure forming a magnetic circuit; means on said electromagnet for supporting said armature for angular movement relative to said core pole surface to attracted position adjacent thereto substantially about a line disposed transversely to said core between said core pole face and the longitudinal midpoint of said magnetic circuit structure with said shank portions reacting against said return legs at the commencement of said angular armature movement substantially along said line; said armature further having at least one portion adapted for engagement with a load actuating member; means disposing a load actuating member adjacent said armature so that during energization of said winding said armature shanks are attracted towards said return legs, and said load actuating portion of the armature bears against said load actuating member in engagement therewith; means for providing at said commencement of angular armature movement a wedge-shaped air gap between said armature pole portion and said core pole face with a small gap therebetween in proximity to said winding and a larger air gap therebetween in proximity to said core end, with the ratio between said two air gaps being in the range of 1.25:1 to 4:1.

30. An electromagnet as defined in claim 29, wherein said second-recited means disposes said load actuating member at a distance from said small gap and said transversely extending line so that the length of travel of armature pole portion adjacent said small gap does not exceed approximately half the length of travel of said load actuating member during angular armature movement to attracted position.

31. An electromagnet comprising: a flat open ended E-shaped magnetic field structure having a yoke portion with a central elongated core leg longitudinally extending forwardly therefrom, with first and second magnetic return legs extending forwardly therefrom each in spaced opposed substantially parallel relation to said core leg; said core leg having a substantially plane pole area substantially parallel to the longitudinal axis of said core leg; said return legs terminating longitudinally adjacent said pole area and having plane surfaces lying in the plane of said pole area; coil means on said core leg for magnetizing said core leg pole area to a different magnetic potential from said return legs to establish a magnetic flux therebetween; a substantially flat U-shaped magnetic armature including a pole portion with substantially plane attracting surface extending transversely to said core leg axis facing said core leg pole area with a working air gap therebetween, said pole portion having longitudinally spaced boundaries including a rearward boundary disposed adjacent said coil means and a forward boundary disposed adjacent the free end of said core leg, said armature further comprising first and second spaced coplanar magnetic shanks extending rearwardly towards said yoke portion on either side of said winding with surfaces lying in a common plane facing said plane surfaces on said return legs in overlapping relation; said armature and said field structure forming a magnetic circuit arrangement with the armature providing a flux path between said pole area and return leg transverse to the longitudinal axis of said core leg; means on said electromagnet supporting said armature for angular movement from retracted position spaced from said core pole area to attracted position more closely adjacent thereto substantially about an effective axis extending substantially normal to said core and return legs with said forward boundary having at least 1.25 times greater length of travel than said rearward boundary during such angular movement to attracted position and with said shanks reacting against said return legs during such angular movement; means including said shanks for providing in said retracted position at least the minimum effective non-magnetic spacing between said armature and said core pole area sufficient to avoid substantial short circuiting of said flux between said core pole area and said return member through said armature; each of said magnetic return legs extending forwardly at least along substantially the entire length of said overlapping shanks so that each shank is in magnetically coupled relation along at least substantially its entire length with its associated return leg providing an extensive area for flux passage therebetween.

32. An electromagnet as defined in claim 31, wherein each of said outer return legs overlaps said armature pole portion terminating substantially opposite said forward boundary.

33. For an electromagnet, a magnetic circuit arrangement comprising: a magnetic field structure having a yoke portion with an elongated core leg longitudinally extending forwardly therefrom, and at least one magnetic return leg extending forwardly therefrom in spaced opposed relation to said core leg; said core leg having a substantially plane pole surface substantially parallel to the longitudinal axis of said core leg; a magnetic armature having a pole portion with a substantially plane attracting surface extending transversely to said core leg axis and facing said core pole surface with a working air gap therebetween, said armature and said field structure forming a magnetic circuit with the armature providing a path for a magnetic flux between said core pole surface and said return leg transversely to said longitudinal core leg axis; means providing for angular movement of said armature relative to said core pole surface between retracted position spaced therefrom to attracted position more closely adjacent thereto substantially about a line extending transversely to said core and return leg within the forward half of said magnetic circuit; means for providing at the commencement of said angular armature movement to attracted position and at least until substantially the completion thereof, at least a minimum effective non-magnetic spacing between said armature pole portion and said core pole surface sufficient to avoid substantial short circuiting of said flux between said core pole surface and said return leg through said armature; and means for providing at said working gap at said commencement of angular armature movement an air gap between said core pole surface and said armature attracting surface which increases in thickness in the direction of said core axis from at least said minimum effective spacing at its end nearest said transversely extending line to at least 1.25 times greater spacing at its other end.

34. For an electromagnet, a subcombination as defined in claim 33, wherein: said magnetic field structure has a yoke portion with a central elongated core leg extending longitudinally forwardly therefrom, with first and second outer magnetic return legs longitudinally extending forwardly therefrom each in spaced opposed relation to said core leg; and said first-recited means supports said armature for angular movement with said armature reacting against said outer return legs at the commencement of angular movement to attracted position.

35. In a relay, an electromagnet comprising: a flat open-ended generally E-shaped magnetizable field structure having a yoke portion with a central core leg and two outer magnetic return legs longitudinally extending forwardly therefrom in spaced parallel relation, each leg having a free end with the return legs terminating adjacent the free end of said core leg; each of said legs having a surface substantially in a common plane parallel to the longitudinal axes of said core leg, with said core leg having a pole area in said plane adjacent the free end thereof; elongated coil means surrounding said middle core leg for magnetizing said core pole area to a magnetic potential differing from each of said return legs to establish a magnetic flux therebetween when energized, said coil means being shorter than said core leg and positioned adjacent said yoke portion with the free end of said core leg and said pole area thereon projecting forwardly beyond it; a substantially flat generally U-shaped magnetic armature including a pole portion extending transversely to said core leg adjacent its free end with a substantially plane attracting surface facing said core pole area, said pole portion having longitudinally spaced boundaries including a rearward boundary disposed adjacent said coil means and a forward boundary disposed adjacent said free end of the core leg, said armature further comprising a pair of spaced magnetic shanks extending rearwardly from said armature pole portion on either side of said coil substantially overlying said return legs, said armature shanks being at least one third as long as the minimum distance between said forward and rearward boundaries but considerably shorter than said return legs and entirely disposed forwardly of the longitudinal mid-point of said core leg; said armature and field structure forming a magnetic circuit arrangement with the armature providing a flux path between said pole area and return legs transverse to said core leg axis; means on said electromagnet supporting said armature for unjournalled angular movement relative to said core pole area between retracted position spaced from the core pole area to attracted position more closely adjacent thereto substantially about an effective axis extending substantially perpendicular to said core and return legs between said rearward armature boundary and the longitudinal mid-point of said core leg with said shanks reacting against said return legs during said armature movement to attracted position; means preventing direct contact between said armature and core pole area adjacent said forward armature boundary when the armature is in attracted position; resilient means biasing said armature towards retracted position; and means including a stop disposed on said field structure for providing in said retracted position a wedge-shaped working air gap between the plane of said flat armature attracting surface and said core pole area with said forward armature boundary being spaced at least 1.25 times greater distance from said core pole area as said rearward boundary.

36. An electromagnet device as defined in claim 35 wherein said armature shanks react directly on said return legs in magnetic contact therewith in said retracted position and during said angular armature movement to attracted position.

37. An electromagnet as defined in claim 35 wherein the spacing between said inner armature boundary and core pole area is approximately 0.25 mm.

38. An electromagnet as defined in claim 35, wherein each of said armature shanks is shorter than the transverse width of said armature.

39. In a relay, an electromagnet comprising: a magnetic field structure having a yoke portion with a central elongated core leg longitudinally extending forwardly therefrom, and first and second outer magnetic return legs longitudinally extending forwardly therefrom each in spaced opposed relation to said core leg; said core leg having a substantially plane pole surface substantially parallel to the longitudinal axis of said core leg; coil means on said core leg for magnetizing said pole surface thereon to a different magnetic potential from each of said return legs to establish a magnetic flux therebetween when energized; a magnetic armature having a pole portion extending transversely to said core leg axis with a substantially plane attracting surface facing said core pole surface, said armature and field structure forming a magnetic circuit with the armature providing a flux path between said core pole surface and return legs transverse to said longitudinal core leg axis; said armature being generally U-shaped and including a pair of spaced shanks extending from said pole portion overlying said return legs, the shanks being relatively short and disposed entirely within the forward half of said magnetic circuit; means supporting said armature for angular movement relative to said pole surface between retracted position spaced therefrom to attracted position more closely adjacent thereto substantially about an effective axis extending transversely to said core and said return legs within the forward half of said magnetic circuit with said armature shanks reacting against said return legs in retracted position and during said angular movement; means including said shanks for providing in said retracted position at least the minimum non-magnetic spacing between said armature pole portion and said core pole surface sufficient to avoid substantial short circuiting of said flux between said pole surface and return legs through said armature; said armature pole portion having first and second longitudinally spaced boundaries with said first boundary closer to said transversely extending axis than said second boundary; and means for providing in said retracted position a working air gap between said core pole surface and said armature attracting surface which increases from at least said minimum effective spacing adjacent said first armature boundary to at least two times greater spacing adjacent said second armature boundary.

40. An electromagnet as defined in claim 1 wherein: said armature is in retracted position at said commencement of angular movement to attracted position, and the longitudinal position of said transversely extending effective axis relative to said core leg remains substantially fixed during angular armature movement from retracted to attracted position.

41. An electromagnet as defined in claim 9 wherein: said armature is in retracted position at said commencement of angular movement to attracted position, and the longitudinal position of said transversely extending line relative to said core leg remains substantially fixed during angular armature movement from retracted to attracted position.

42. In a relay, an electromagnet comprising: a magnetic field structure having a yoke portion with a central elongated core leg longitudinally extending forwardly therefrom, and first and second outer magnetic return legs longitudinally extending forwardly therefrom each in spaced opposed relation to said core leg; said core leg having a substantially plane pole surface substantially parallel to the longitudinal axis of said core leg; coil means on said core leg for magnetizing said pole surface thereon to a different magnetic potential from each of said return legs to establish a magnetic flux therebetween when energized; a magnetic armature having a pole portion extending transversely to said core leg axis with a substantially plane attracting surface facing said core pole surface, said armature and field structure forming a magnetic circuit with the armature providing a flux path between said core pole surface and return legs transverse to said longitudinal core leg axis; said armature being generally U-shaped and including a pair of spaced shanks extending from said pole portion overlying said return legs, with said pole portion having first and second longitudinally spaced boundaries, said first boundary being closer to said coil means than said second boundary; means supporting said armature for angular movement relative to said pole surface between retracted position spaced therefrom to attracted position more closely adjacent thereto substantially about an effective axis extending transversely to said core leg and located substantially at the longitudinal mid-point of said magnetic circuit with said armature shanks reacting against said return legs during said angular movement; means including said shanks for providing in said retracted position at least the minimum non-magnetic spacing between said armature pole portion and said core pole surface sufficient to avoid substantial short circuiting of said flux between said pole surface and return legs through said armature and a working air gap between said core pole surface and said armature attracting surface which increases from at least said minimum spacing adjacent said first armature boundary to at least 1.25 times greater spacing adjacent said second armature boundary.

43. An electromagnet as defined in claim 29 wherein: said armature is in retracted position at said commencement of angular movement to attracted position, and the longitudinal position of said transversely disposed line relative to said core leg remains substantially fixed during angular armature movement from retracted to attracted position.

44. An electromagnet comprising: a magnetic field structure having a yoke portion with a central elongated core leg longitudinally extending forwardly therefrom, with first and second outer magnetic return legs longitudinally extending forwardly therefrom each in spaced opposed relation to said core leg; said core leg having a substantially plane pole surface substantially parallel to the longitudinal axis of said core leg; coil means on said core leg for magnetizing said pole surface thereon to a different magnetic potential from each of said return legs to establish a magnetic flux therebetween when energized; a magnetic armature having a pole portion with a substantially plane attracting surface extending transversely to said core leg axis and facing said core pole surface with a working air gap therebetween, said armature and said field structure forming a magnetic circuit with the armature providing a flux path between said core pole surface and return legs transverse to said longitudinal core leg axis; means supporting said armature for angular movement to attracted position adjacent said core pole surface substantially about an effective axis extending transversely to said core and return legs within the forward half of said magnetic circuit; means for providing at said working gap at the commencement of angular armature movement to attracted position and at least until substantially the completion of such movement at least the minimum effective non-magnetic spacing between said armature pole portion and said core pole surface sufficient to avoid substantial short circuiting of said flux between said core pole surface and said return legs through said armature, with said means also providing at said commencement of angular armature movement an air space between the core pole surface and armature attracting surface which increases in the direction of said longitudinal core axis from said effective spacing at its end nearest said effective axis to at least 1.25 times greater spacing at its other end.

45. An electromagnet as defined in claim 44 wherein: said armature is in retracted position at said commencement of angular movement to attracted position, and the longitudinal position of said effective axis relative to said core leg remains substantially fixed during angular armature movement from retracted to attracted position.

References Cited in the file of this patent

UNITED STATES PATENTS

| Number | Name | Date |
|---|---|---|
| 638,101 | Cutler | Nov. 28, 1899 |
| 991,829 | Clement | May 9, 1911 |
| 1,298,701 | Harrington | Apr. 1, 1919 |
| 1,812,545 | Nilson | June 30, 1931 |
| 2,120,339 | Mishelevich | June 14, 1938 |
| 2,162,356 | Peek, Jr. | June 13, 1939 |
| 2,174,592 | Peek | Oct. 3, 1939 |
| 2,178,656 | Swenson | Nov. 7, 1939 |
| 2,278,230 | Wood | Mar. 31, 1942 |
| 2,294,327 | Zupa | Aug. 25, 1942 |
| 2,323,961 | Zupa | July 13, 1943 |
| 2,327,549 | Peek, Jr. | Aug. 24, 1943 |
| 2,460,556 | Wagner | Feb. 1, 1949 |
| 2,462,894 | Price | Mar. 1, 1949 |

FOREIGN PATENTS

| Number | Country | Date |
|---|---|---|
| 28,824 | Great Britain | 1912 |
| 186,433 | Great Britain | Oct. 2, 1922 |
| 298,241 | Great Britain | Sept. 19, 1929 |
| 316,880 | Great Britain | Feb. 2, 1931 |
| 357,234 | Great Britain | Sept. 21, 1931 |
| 372,873 | Great Britain | May 19, 1932 |
| 585,444 | Great Britain | Feb. 6, 1947 |
| 476,403 | Germany | Mar. 4, 1927 |
| 511,322 | Germany | Oct. 16, 1930 |
| 533,917 | Germany | Sept. 21, 1927 |
| 576,720 | Germany | June 16, 1931 |
| 637,984 | Germany | Oct. 15, 1936 |
| 660,210 | Germany | Apr. 28, 1938 |